United States Patent [19]

Miller et al.

[11] Patent Number: 5,489,331
[45] Date of Patent: Feb. 6, 1996

[54] COLOR CHANGING COMPOSITIONS USING ACIDS

[75] Inventors: Richard E. Miller, Nazareth, Pa.; Charlene R. Couch, Richmond, Va.

[73] Assignee: Binney & Smith Inc., Easton, Pa.

[21] Appl. No.: 270,454

[22] Filed: Jul. 5, 1994

Related U.S. Application Data

[63] Continuation-in-part of Ser. No. 89,503, Jul. 16, 1993, Pat. No. 5,326,388, which is a continuation-in-part of Ser. No. 923,308, Jul. 31, 1992, Pat. No. 5,232,494, said Ser. No. 270,454, Jul. 5, 1994 is a continuation-in-part of Ser. No. 78,722, Jun. 16, 1993, Pat. No. 5,352,282, which is a continuation of Ser. No. 923,308, Jul. 31, 1992, Pat. No. 5,232,494.

[51] Int. Cl.$^6$ .................................................. C09D 11/00
[52] U.S. Cl. .................. 106/22 B; 106/21 R; 106/21 A; 106/23 B
[58] Field of Search .................. 106/21 R, 21 A, 106/23 B, 22 B

[56] References Cited

U.S. PATENT DOCUMENTS

| | | | |
|---|---|---|---|
| 1,550,048 | 8/1925 | Ruben | 346/140 R |
| 2,086,745 | 8/1935 | Sell | 106/22 B |
| 2,305,098 | 12/1942 | Minnear | 106/23 B |
| 2,453,201 | 11/1948 | Cushman | 401/198 |
| 2,555,474 | 6/1951 | deVries | 106/22 H |
| 2,559,608 | 7/1951 | Ehrlich | 106/22 A |
| 2,589,306 | 3/1952 | Steiner | 106/22 A |
| 3,221,361 | 12/1965 | Cline | 401/198 |
| 3,400,003 | 8/1966 | Guertin | 106/22 R |
| 3,617,325 | 11/1971 | Spokes et al. | 427/145 |
| 3,627,546 | 12/1971 | Coppeta | 106/21 A |
| 3,672,842 | 6/1972 | Florin | 106/21 A |
| 3,700,603 | 10/1972 | Rembaum | 106/21 A |
| 3,705,045 | 12/1972 | Nadolski | 106/22 D |
| 3,870,435 | 3/1975 | Watanabe et al. | 427/145 |
| 3,873,185 | 3/1975 | Rogers | 430/4 |
| 3,876,496 | 4/1975 | Lozano | 106/21 A |
| 3,886,083 | 5/1975 | Laxer | 106/21 A |
| 3,941,488 | 3/1976 | Maxwell | 401/17 |
| 3,945,836 | 3/1976 | Miyata | 106/22 R |
| 3,945,837 | 3/1976 | Miyata et al. | 106/22 D |
| 3,952,314 | 4/1976 | Maltz | 346/140 R |
| 3,966,400 | 6/1976 | Birke et al. | 8/82 |
| 3,982,251 | 9/1976 | Hochberg | 106/21 A |
| 3,990,839 | 11/1976 | von der Eltz et al. | 8/14 |
| 4,028,118 | 6/1977 | Nakasuji et al. | 106/21 E |
| 4,070,194 | 1/1978 | Arakawa | 106/21 R |
| 4,071,645 | 1/1978 | Kahn | 106/6 |
| 4,139,965 | 2/1979 | Curry et al. | 427/333 |
| 4,162,164 | 7/1979 | Lin | 106/21 R |
| 4,171,982 | 10/1979 | Lin | 106/21 A |
| 4,176,361 | 11/1979 | Kawada et al. | 106/20 R |
| 4,193,906 | 3/1980 | Hatanaka | 106/23 B |
| 4,212,676 | 7/1980 | Ueda | 106/19 B |
| 4,213,717 | 7/1980 | Lin | 106/22 B |
| 4,227,930 | 10/1980 | Lin | 106/22 B |
| 4,246,033 | 1/1981 | von Wartburg | 106/23 B |
| 4,252,845 | 2/1981 | Griffiths et al. | 106/21 A |
| 4,256,494 | 3/1981 | Yamamoto et al. | 106/22 A |
| 4,322,466 | 3/1982 | Tomlinson | 106/21 R |
| 4,352,691 | 10/1982 | Owatari et al. | 106/22 R |
| 4,413,266 | 11/1983 | Aviram et al. | 106/22 B |
| 4,428,994 | 1/1984 | Rawlins | 427/260 |
| 4,460,727 | 7/1984 | Shoji | 106/23 R |
| 4,490,177 | 12/1984 | Shioi et al. | 106/22 R |
| 4,505,749 | 3/1985 | Kanekiyo et al. | 106/22 R |
| 4,525,215 | 6/1985 | Shioi et al. | 106/22 R |
| 4,525,216 | 6/1985 | Nakanishi | 106/23 B |
| 4,557,618 | 12/1985 | Iwata et al. | 106/20 R |
| 4,578,117 | 3/1986 | Nakanishi | 106/20 A |
| 4,604,139 | 8/1986 | Shioi et al. | 106/23 C |
| 4,620,941 | 11/1986 | Yoshikawa et al. | 252/408.1 |
| 4,681,471 | 7/1987 | Hayduchok et al. | 106/22 B |
| 4,708,817 | 11/1987 | Dudnick | 106/22 B |
| 4,725,316 | 2/1988 | Mahany, II | 106/499 |
| 4,732,614 | 3/1988 | Brooks et al. | 106/23 B |

(List continued on next page.)

FOREIGN PATENT DOCUMENTS

| | | |
|---|---|---|
| 282178 | 2/1988 | European Pat. Off. . |
| 289141 | 3/1988 | European Pat. Off. . |
| 352796 | 7/1989 | European Pat. Off. . |
| 506452 | 3/1992 | European Pat. Off. . |
| 2241653 | 3/1975 | France . |
| 2487372 | 3/1981 | France . |
| 551775 | 6/1932 | Germany . |
| 2724820 | 6/1977 | Germany . |
| 2834459 | 8/1978 | Germany . |
| 2927006 | 7/1979 | Germany . |
| 2927005 | 7/1979 | Germany . |
| 3207217 | 2/1982 | Germany . |
| 59-86672 | 5/1984 | Japan . |
| 59-179572 | 10/1984 | Japan . |
| 62-28834 | 7/1987 | Japan . |
| 1-103676 | 4/1989 | Japan . |
| 3-243673 | 10/1991 | Japan . |
| 1455678 | 1/1975 | United Kingdom . |
| 94/06872 | 9/1992 | WIPO . |

OTHER PUBLICATIONS

Photocopy of the Packaging Material, Binney & Smith, Inc., Easton, PA. (1992).
"Color Fibre Pen Inks", BASF Brochure, (1979).
Miscellaneous Popping Marker Documents, no date available.

*Primary Examiner*—Helene Klemanski
*Attorney, Agent, or Firm*—Leydig, Voit & Mayer, Ltd.

[57] ABSTRACT

A multiple coloring composition system is disclosed whose coloring effect is changed upon treatment with an overcolor, once the overcolor coloring composition has been deposited over the undercolor coloring composition. The multiple ink system comprises:

(a) an undercolor aqueous coloring composition comprising an undercolor dye whose coloring ability is destroyed in the presence of an acid; and (b) an overcolor aqueous coloring composition comprising a colorant capable of maintaining its characteristic color in the presence of a pH of about 4 or less; and an acid sufficient to bring the pH of the overcolor composition to about 4 or less.

28 Claims, No Drawings

U.S. PATENT DOCUMENTS

| | | | |
|---|---|---|---|
| 4,744,826 | 5/1988 | Iijima | 106/20 A |
| 4,746,936 | 5/1988 | Takahashi | 346/140 R |
| 4,889,559 | 12/1989 | Goldberg et al. | 106/21 C |
| 4,907,903 | 3/1990 | Kawashima | 106/21 R |
| 4,942,185 | 7/1990 | Inoue et al. | 521/54 |
| 4,954,174 | 9/1990 | Imagawa | 106/27 R |
| 4,954,544 | 9/1990 | Chandaria | 524/111 |
| 4,988,123 | 1/1991 | Lin et al. | 106/23 R |
| 5,004,763 | 4/1991 | Imagawa | 523/161 |
| 5,006,171 | 4/1991 | Mecke et al. | 106/20 A |
| 5,009,536 | 4/1991 | Inoue et al. | 106/20 C |
| 5,017,226 | 5/1991 | Kulisz | 106/21 C |
| 5,043,013 | 8/1991 | Kluger et al. | 106/20 R |
| 5,082,386 | 1/1992 | Hironaka et al. | 401/206 |
| 5,106,881 | 4/1992 | Inoue et al. | 521/54 |
| 5,118,350 | 6/1992 | Prasad | 106/22 R |
| 5,120,359 | 6/1992 | Uzukawa et al. | 106/20 A |
| 5,139,572 | 8/1992 | Kawashima | 106/21 R |
| 5,176,746 | 1/1993 | Nakanishi et al. | 106/25 R |
| 5,196,243 | 3/1993 | Kawashima | 106/21 R |
| 5,203,913 | 4/1993 | Yamamoto et al. | 106/22 B |
| 5,215,956 | 6/1993 | Kawashima | 106/21 R |
| 5,222,823 | 6/1993 | Conforti | 106/22 B |
| 5,232,494 | 8/1993 | Miller | 106/22 B |
| 5,262,535 | 11/1993 | Kaiser | 106/22 B |
| 5,320,668 | 6/1994 | Shields et al. | 106/20 R |
| 5,326,388 | 7/1994 | Miller et al. | 106/22 B |
| 5,352,282 | 10/1994 | Miller | 106/21 A |

COLOR CHANGING COMPOSITIONS USING ACIDS

RELATED APPLICATIONS

This application is a continuation-in-part of previous U.S. patent application Ser. No. 08/089,503 filed Jul. 16, 1993 now U.S. Pat. No. 5,326,388 which was a continuation-in-part of previous U.S. patent application Ser. No. 07/923,308 filed Jul. 13, 1992 which issued as U.S. Pat. No. 5,232,494 on Aug. 3, 1993. This application is also a continuation-in-part of U.S. patent application Ser. No. 08/078,722 filed Jun. 16, 1993 now U.S. Pat. No. 5,352,282 which was a continuation of previous U.S. patent application Ser. No. 07/923,308 filed Jul. 13, 1992 which issued as U.S. Pat. No. 5,232,494 on Aug. 3, 1993.

FIELD OF THE INVENTION

This invention relates generally to the field of coloring compositions and more particularly to a pair of coloring compositions which may be used in conjunction with each other to enable laying down an initial mark using an undercolor coloring composition yielding a first color and then using an overcolor coloring composition to enable a change of color of a portion or the entirety of the initial mark.

BACKGROUND OF THE INVENTION

Children enjoy various drawing and coloring activities using a variety of mediums. Useful in such activities are markers containing inks, crayons, pencils of various colors, and various paints including water colors, oil paints and acrylic paints. However, children would often like to change the color of a mark after they have made the mark. One instance would be the desire to add a yellow sun over a previously colored blue sky.

Coloring compositions generally are mixtures of a coloring matter dispersed or dissolved in a carrier fluid. The colorant, if readily dissolving in the carrier fluid, is termed a dye. An insoluble coloring material is termed a pigment. Pigments are finely ground solid materials and the nature and amount of pigment contained in an ink determines its color. Coloring composition may also optionally include such ingredients as humectants, preservatives, bittering agents, and drying agents. Humectants function to improve freeze/thaw stability and to control drying out of the tip when the coloring composition is used as a marker ink. Preservatives serve the obvious function of preventing spoilage of the ink during the expected shelf life of the marker product. Drying agents speed drying of a mark laid down by a marker. Bittering agents impart the coloring composition with an unpleasant taste, so that children and animals will not consume the coloring composition.

Changing the color of a mark is not readily done with the typical children's coloring instruments such as those described. In the past, children changed the marks by placing the mark of one color over the mark of another color. When performing this using traditional marking pens, the marks produced are often not the desired colors and the tips of the markers get soiled with the other inks, rendering the marker useless. If attempted with traditional children's paints, the colors tend to bleed together resulting in undesirable color smears. Therefore, there has been a long felt need for coloring compositions, including paints, inks, and markers containing such compositions, which produce marks of a first color that can be readily changed into a wide variety of second colors. Especially needed is such a group of compositions which may be used in markers without soiling the nib of the second used marking instrument.

In one available marker application, a child is able to change a specific initial mark laid down to a second specific color by applying a bleach to the first mark yielding a change in color. The marker inks used in these markers are typically prepared by blending a bleach or pH sensitive dye with a dye that is stable in bleach or high pH. For example, German Patent Specification No. 2724820, (hereinafter "the German Patent"), concerns the combining of a chemically stable dye and a chemically unstable dye in an ink formulation. Once a mark using this combination of stable and unstable dyes is laid down, the mark may be overwritten with a clear bleach solution, eliminating the color contribution of the unstable dye. The resulting mark of the stable dye, with its characteristic color, remains.

There are several drawbacks to such a marking system. First, there are strict limitations on the number of color changes which may be produced. Specifically, in formulations made according to the German Patent, the particular ink composition may only be changed from a first color to a fixed second color. For example, a green mark may only be changed to a violet color as the inks are described in the practice of the German Patent. In addition, since one of the required pair of markers contains only the bleaching agent, that bleaching marker cannot render a visible mark and may only be used in combination with the base color marker. Once the base color marker is used up, the bleaching marker is of no use. Or, once the bleaching marker is used up, the base color marker may only be used for the color which it initially marks with. A further disadvantage of the marking process of the German Patent is that the nib of the bleaching marker tends to get soiled by picking up the colors of the base coloring composition, thus tainting the color of subsequent marks.

Therefore, an object of the present invention is to provide a coloring composition system which is capable of enhanced multiple color changing abilities.

An additional object of the present invention is to produce a coloring composition system which includes at least two different coloring compositions each of which may be used independently or which may be used in combination to provide color changing ability.

A further object of the present invention is to provide a coloring composition system in the form of inks which prevents a nib of a color changing marker from becoming visibly soiled from contacting a base color composition.

These and other objects will become apparent to those skilled in the art to which the invention pertains.

SUMMARY OF THE INVENTION

The present invention overcomes the drawbacks associated with prior overwriting ink compositions in that the particular undercolor coloring composition made according to the invention may be changed to multiple second colors, depending upon the dye present in the overcolor composition.

Advantageously, an overcolor composition of the present invention makes a visible mark, thus it may be used alone or in combination with an undercolor coloring composition.

An additional advantage of the overcolor composition of the present invention is that unlike prior color change markers, the nib of the tip of marker containing the overwriter ink does not become visibly soiled with the undercolor coloring composition because the undercolor is immediately destroyed upon contact with the overcolor composition.

In general, the present invention is a multiple coloring composition system whose coloring effect may be changed upon treatment with an overcolor coloring composition, once the overcolor coloring composition has been deposited over the undercolor coloring composition. In one embodiment, the multiple coloring composition system comprises:

(a) an undercolor aqueous coloring composition comprising an undercolor dye whose coloring ability is destroyed in the presence of a pH of about 4 or less; and (b) an overcolor aqueous coloring composition comprising a colorant capable of maintaining its characteristic color in the presence of a pH of about 4 or less, and an effective amount of an acid sufficient to yield a pH of said overcolor coloring composition of about 4 or less.

Suitable dyes for use in the undercolor coloring composition include those xanthene dyes, pthalocyanine dyes, and azo dyes which are unstable in the presence of a pH of about 4 or less. Suitable colorants for use in the overcolor coloring composition include pigments, polymethine dyes, triphenylmethane dyes, and azo dyes which are stable in the presence of a pH of about 4 or less. Suitable acids for the for use in compositions of the invention include phosphoric acid, sulfuric acid, and citric acid.

Also disclosed is an ink composition system comprising:

(a) an undercolor aqueous ink comprising an undercolor dye whose coloring ability is destroyed in the presence of a pH of about 4 or less in an amount of from about 0.5% to about 6% by weight of the undercolor ink; and (b) an overcolor aqueous ink comprising from about 0.5% to about 30% by weight of said overcolor ink of an acid; and from about 0.5% to about 6% by weight of said overcolor ink of a colorant which maintains its characteristic color in the presence of a pH of about 4 or less.

A color changing marking system is also disclosed which comprises at least two marking instruments. The undercolor marking instrument contains an undercolor ink composition comprising a dye whose coloring ability is destroyed in the presence of a pH of about 4 or less. The overcolor writing instrument contains an overcolor ink comprising (1) from about 0.5% to about 30% by weight of an acid; and (2) from about 0.5% to about 6% by weight of a colorant which maintains its characteristic color in the presence of a pH of about 4 or less.

When formulated as inks, the coloring compositions of the invention may also optionally comprise an anti-oxidant, a stabilizing base, a humectant, a drying agent, a bittering agent, and a preservative. When formulated as paints, the coloring compositions of the present invention may also optionally comprise a binder, a thickener, a filler, an extender, a dispersant, a freeze-thaw protector, or other ingredients conventionally used in paints.

DETAILED DESCRIPTION OF THE INVENTION

The present invention imparts the desirable ease of application and convenience of use of traditional color changer systems while avoiding the strict limitations of current color change markers. The composition of the present invention therefore imparts improved and convenient coloring properties.

In general, the present invention is a multiple coloring composition system wherein the color of a mark laid down by an undercolor coloring composition, for example using a marker to dispense the composition, may be overwritten by a variety of second colors upon the application of an overcolor coloring composition over the undercolor coloring composition. An embodiment of this marking system comprises:

(a) an undercolor aqueous coloring composition comprising an undercolor dye whose coloring ability is destroyed in the presence of a pH of about 4 or less; and (b) an overcolor aqueous coloring composition comprising a colorant capable of maintaining its characteristic color in the presence of a pH of about 4 or less, and an acid in an amount sufficient to yield a pH of said overcolor aqueous coloring composition of about 4 or less. To lower the pH of the overcolor aqueous coloring composition, an acid in an amount sufficient to lower the pH of the overcolor aqueous coloring composition to a level of about 4 or less, and preferably from about 2 to 4, is preferably used.

Most suitable for use as dyes in the undercolor coloring compositions are dyes or indicators whose coloring abilities are easily destroyed in the presence of a pH of about 4 or less. By "destroyed" is meant any reaction wherein the color of the dye or indicator is reversibly or irreversibly destroyed or modified. Such coloring compositions are commonly known in the field and are occasionally used as chemically "erasable" inks. Especially suitable for use as dyes in the undercolor coloring composition are those xanthene dyes, pthalocyanine dyes, and azo dyes which are unstable in the presence of a pH of about 4 or less. Dyes which have been found to meet these criteria include Acid Red 92 marketed by International Dyestuffs Corporation, Acid Yellow 1 marketed by International Dyestuffs, PYRANINE 120™, generically referred to as Solvent Green 7 marketed by Miles(Mobay), Solvent Red 48, and mixtures thereof.

Acid Red dyes, classified as xanthene dyes, are generally used as colorants for foods, drugs, and cosmetics. Specifically, Acid Red 92, the disodium salt of 2,4,5,7-tetrabromo-9-3,4,5,6, tetrachloro-o-carboxylphenyl)-6-hydroxy- 3-isoxanthone, is called D & C Red No. 28 by the FDA, and sold under the tradename Phloxine B.

To achieve good coloring of the undercolor coloring composition, the minimum concentration of dye which will produce a workable ink is governed by the color intensity desired, though as little as 0.1% dye may be sufficient for certain applications. The maximum workable concentration of dye is determined largely by the ability to maintain a stable composition and the depth of color desired and can vary widely depending upon the concentration of other components. It is also a function of the characteristics of the desired end product, though a practical upper limit in the formulation of, for example, a marker ink, is about 15% by weight. The preferred concentration range for most applications is from about 0.5% to about 6% dye by weight of the composition. A concentration of about 1.5% to about 4% is even more preferred when the undercolor coloring composition is to be used as an ink for a typical marker to ensure good coloration.

The overcolor coloring composition of the present invention is formulated by combining an acid with a colorant which maintains its characteristic color in the presence of low pH conditions. A limited number of dye colorants meet this criteria. Dyes to be used in the overcolor coloring composition must be highly resistant to chemical attack such as from low pH conditions. Dyes which have been found to meet these criteria include those polymethine dyes, triphenylmethane dyes, cyanine dyes, methine dyes, and azo dyes which are stable in the presence of a pH of about 4 or less. Such dyes include the dyes marketed under the tradenames Acid Green 3 by International Dyestuffs Corporation, Acid Blue 93 and Acid Violet 19 marketed by Spectra Color Corporation, Acid Yellow 23 marketed by Crompton & Knowles, and mixtures thereof.

Polymethine dyes are colored substances in which a series of —CH═ (methine) groups connect to terminal groups of a chromophore. Polymethine and cyanine are often used interchangeably as generic terms for all polymethine dyes. The previous primary usage for polymethine dyes are dying acetate rayon as well as polyacrylnitrile and polyacrylamide.

Acid Green 3 and Acid Violet 19 are azo dyes, which is the largest and most versatile class of dyes, and characterized by the presence of one or more —N═N— (azo) groups. Acid Green 3 is commonly used in making pulp colors or lakes. Acid Violet dyes are primarily fashion colors.

To achieve good coloring of the overcolor coloring composition, the minimum concentration of dye which will produce a workable ink is governed by the color intensity desired, though as little as 0.1% dye may be sufficient for certain applications. The maximum workable concentration of dye is determined largely by the ability to maintain a stable composition and the depth of color desired and can vary widely depending upon the concentration of other components. It is also a function of the characteristics of the desired end product, though a practical upper limit in the formulation of, for example, a marker ink, is about 15% by weight. The preferred concentration range for most applications is from about 0.5% to about 6% dye by weight of the composition. A concentration of about 1.5% to about 4% is even more preferred when the overcolor coloring composition is to be used as an ink for a typical marker to ensure good coloration.

Pigments may be used as an excellent colorant in the overcolor coloring compositions of the invention. To achieve good coloring of the overcolor coloring composition and promote compatibility with the remaining ink components, the pigment is utilized in the form of an aqueous dispersion, inasmuch as pigments are by definition insoluble materials. Pigment dispersions are commercially available which are combinations of a pigment, an aqueous based character, and a surfactant or dispersant system. A pigment dispersion may also be prepared specifically for use in the overcolor coloring composition of the invention. From the standpoint of convenience, a commercial pigment dispersion is preferred for use in the present invention. Typical commercial dispersions contain 30 to 74% by weight active pigment ingredients.

In general, a workable pigment dispersion may have a wide or narrow particle size range depending upon the use to which the ink will be put. The lower limit on pigment particle size is determined not by any functional characteristic of the overcolor coloring composition, but by the ability to form a stable dispersion. Similarly, the upper limit on pigment particle size is determined by the type of applicator by which the overcolor coloring composition is to be applied or dispensed, since pigment particle size determines the ability of pigment particles to flow through, for example, the matrix of a marker nib where the overcolor coloring composition is in the form of an ink.

Indeed, relatively larger pigment particles can restrict ink flow through many types of nibs commonly utilized in writing and marking instruments, ultimately rendering them inoperable. Larger particle sizes may, however, may be used where the overcolor coloring composition is to be used in, for example, a paint marker, in which the composition is dispensed through a valve assembly, or in a roller ball pen or where there composition is used in the form of a paint and a brush is used to distribute the overcolor coloring composition. Pigments having a mean particle size range from about 0.05 to about 2.0 microns have been found to work well in compositions of the invention.

In choosing the most suitable pigment particle size when coloring compositions of the invention are to be used in the form of, for instance, an ink, one must be guided by the particular nib type to be utilized in the writing or marking instrument in which the ink will be placed. First, of course, a pigment particle size must be selected which will allow the passage of the composition through the nib being used. Further, the pigment particle size should be selected to promote capillary flow through the particular nib being used in the writing or marking instrument. In general, the size of pigment particles should be kept as low as possible while maintaining the stability of the composition. For example, it has been found that an ink to be utilized in a marking instrument having either a porous plastic nib or a bonded fiber nib, an ultra fine pigment dispersion having a mean particle size in the range of from about 0.05 to about 0.5 microns provides acceptable results. A more preferred ultra fine pigment dispersion for such applications has a mean particle size in the range from about 0.05 to about 0.25 microns, since such a dispersion promotes better wicking or capillary flow through the nib. An example of a suitable pigment dispersions, which is especially suited for compositions of the invention used in the form of an ink include Fluorescent Scarlet SF-1013 and Fluorescent Green SF 1012, marketed by Sin Loihi (Japan).

The minimum concentration of pigment which will produce a workable color changing composition is governed by the color intensity desired, though as little as 0.1% active pigment may be sufficient for certain applications. The maximum workable concentration of pigment is determined largely by the ability to maintain a stable composition, and can vary widely depending upon the concentration of other components. The maximum concentration of pigment usable is also a function of the characteristics of the desired end product, though a practical upper limit in the formulation of the overcolor coloring composition used, for example, as a marker ink, is about 30% by weight since higher concentrations may cause ink instability and undesirably high viscosity.

When a commercial pigment dispersion is utilized, as it preferably is, a practical limit is imposed by the concentration of pigment in the dispersion, which, as previously noted, is typically in the range of about 30% to 74% pigment by the weight of dispersion. The preferred concentration range for most applications is from about 1% to about 10% active pigment by weight of the composition. A concentration of about 3% by weight of active pigment is ordinarily required to ensure good coloration in a typical marker ink and most preferred is a concentration of active pigment in a concentration range of about 1.5% to about 5% by weight of the composition.

Acids which may be used in the overcolor coloring composition are typically strong acids, usually having a pH from about 2 to about 4. Typical acids which may be employed in the overcolor coloring composition of the invention include phosphoric acid, sulfuric acid, and citric acid. The preferred acid for use in the overcolor coloring composition of the invention is phosphoric acid. Acid is generally present in the overcolor coloring composition of the invention in an amount from about 0.5% to about 40% with a minimal amount required to allow for the erasing of the undercolor coloring composition of the invention and the maximum amount determined by the stability of the composition and the safety of the composition for use by children. Preferably, the acid added in an amount sufficient to lower the pH of the overcolor coloring composition to a pH of from about 2 to about 4. Preferably, the acid is contained in the overcolor coloring composition in an amount of from about 5% to about 40%, and most preferably in an amount of from about 20% to about 30% by weight of the overcolor coloring composition.

The water used in the undercolor coloring composition and the overcolor coloring composition of the invention is preferably deionized water. The amount of water present in undercolor coloring compositions is typically from about 10% to about 90% and this amount is in large part determined by the desired end use of the undercolor coloring composition, for instance, as an ink or a paint, and the amount of other components included in the undercolor coloring composition. To achieve a desirable viscosity when the undercolor coloring composition is used in the form of, for example, an ink, water is preferably present in an amount of from about 50% to about 90%, and most preferably from about 70% to about 85% by weight of the composition.

The amount of water present in the overcolor coloring composition of the invention is also governed in large part by the desired end use of the composition, for instance, as an ink or a paint, and the amount of other components included in the undercolor coloring composition. The amount of water present in overcolor coloring compositions is typically from about 10% to about 90%. To achieve a desirable viscosity when the overcolor coloring composition is used in the form of, for example, an ink, water is preferably present in an amount of from about 30% to about 60%, and most preferably from about 40% to about 55% by weight of the composition.

The overcolor coloring composition also preferably contains an anti-oxidant. Typical anti-oxidants which may be employed in the overcolor coloring composition include citric acid and phosphoric acid. When citric acid is used as the acid component of the overcolor, it may function as an anti-oxidant as well as an acid. Ascorbic acid and sodium hypophosphite may further be used as anti-oxidants. The preferred anti-oxidant for use in the overcolor coloring composition is citric acid. The anti-oxidant is usually present in the overcolor coloring composition in an amount of from about 0.1% to about 3% by weight of the composition.

The undercolor coloring composition may also contain a stabilizing base. The stabilizing base comprises a base which keeps the undercolor coloring composition at a pH of from about 7.0 to about 8.5. At the elevated pH, the colorant in the undercolor coloring composition remains stable after it is applied to a substrate. The undercolor colorant will not be destroyed until the overcolor coloring composition is applied over the undercolor coloring composition.

Typical stabilizing bases which may be employed in the undercolor coloring composition include sodium hydroxide, sodium carbonate, and monosodium EDTA. The stabilizing base is usually present in the undercolor coloring composition in an amount of from about 0.2% to about 2% by weight of the composition.

Optionally, both the undercolor coloring composition and the overcolor coloring composition may further comprise such additives as a humectant, a drying agent, a bittering agent, and preservatives such as biocides and fungicides.

Addition of a humectant ensures that coloring compositions of the invention, when in the form of an ink, do not prematurely dry in a capillary marking system, such as a bonded fiber marking nib. Typical humectants which may be employed in the coloring compositions of the present invention include polyhydric alcohols such as ethylene glycol, propylene glycol, diethylene glycol, hexylene glycol and poly(ethylene glycol), and hydroxylated starches. The humectant is preferably glycerin.

The humectant is generally used in an amount of from about 0% to about 30% by weight of the composition, though this range is by no means critical. The amount of humectant to be added is determined by the type of nib used in the writing or marking instrument to be employed and the protection time period desired. In one preferred composition, the humectant, glycerin, is added in an amount of about 20% by weight of the coloring composition.

To achieve a more rapid drying rate and to improve marking characteristics upon nonporous materials, a drying agent may be added to increase the overall volatility and therefore the evaporation rate of the water and the pH regulant. Any compatible material which performs this function may be used.

The drying agent preferably should be a volatile polar material so as to ensure compatibility with the primary components of the marker ink. Straight chain C2–C4 alcohols are good, highly volatile drying agents, and of these, ethanol is preferred because of its relatively low cost and because it does not contribute any unpleasant odor to the composition. Alcohols can also provide added benefits, such as reducing surface tension, increasing adherence of the ink to porous surfaces, and providing bactericidal activity when added to the ink composition.

To discourage improper usage of the marker ink, such as ingesting the ink, the alcohol may contain a bittering agent or a conventional denaturant. An alcohol utilizing a bittering agent will discourage such improper usage of the ink by simply imparting a disagreeable taste, while not requiring the use of toxic denaturants as methanol or benzene, and is therefore preferred. A conventional denatured alcohol may, of course, also be utilized. The most preferred drying agent is an ethyl alcohol which contains a bittering agent and which is sold under the trade name SDA 40B, manufactured by Aaper Alcohol.

When utilized, the drying agent preferably is added from about 5% up to about 40% by weight, with the most preferred concentration being about 10% by weight, though these amounts are not critical to the practice of the invention. About 10% per weight of drying agent is ordinarily required to ensure rapid drying of the ink on a nonporous surface, while amounts in excess of about 30% by weight may adversely affect stability of the ink and may cause flocculation of the pigment unless other stabilizing additives are employed.

To maintain the shelf life of the composition, a preservative may be added. The preservative preferably serves as both a bactericide and a fungicide, and is added in any effective amount, though a typical concentration range is from about 0.1% up to about 5% by weight. The use of preservatives in levels greater than about 5% by weight may cause the ink to become toxic or unstable and may, in any event, be unnecessary. Should alcohol be added to the composition as a drying agent, that alcohol will function as a preservative to some extent also.

Any conventional preservative may be utilized in the invention as long as there is compatibility with the remaining ink components. For example, preservatives manufactured by Dow Chemical Co. and sold under the trademarks Dowicil 75 (1-(3-chloroallyl)-3,5,7-triaza-1-azoniaadamantane chloride) and Dowicil 200 (3-chlorovinylhexamethylene tetrammonium chloride) or a preservative manufactured by Rohm and Haas and sold under the trademark Kathon PFM (isothiazolinones), or a preservative manufactured by Sutton Labs and sold under the trademark Germall II (imazolidinyl urea), or a preservative manufactured by Merck and sold under the trademark Tektamer 38 (1,2 dibromo-2, 4-dicyanobutane), will work in the composition of the invention. Additionally, preservatives manufactured by Huls America and sold under the trademark NUOSEPT 95™, an aqueous bicyclic oxazolidines solution can be used.

Other acceptable preservatives include TROYSAN POLYPHASE P100™, a 3-Iodo-2-Propynyl Butyl Carbamate sold by Troy Chemical, commonly mixed with PVP K-30™, a 2-Pyrrolidinone, 1-Ethenyl-, Homopolymer solubilizer (($C_6MgNO$)$_x$ sold by ISP Technologies Inc., and M-PYROL™, a 1-Methyl-Pyrrolidinone solubilizer sold by GAF Chemicals Corporation. Addition of preservatives to the undercolor and overcolor coloring compositions inhibits the growth of bacteria and fungi in water-based products.

Typically, a child may make marks or color a picture using one or more markers containing various undercolor coloring compositions on a suitable substrate, such as paper. The child may then select one or more markers containing various overcolor coloring compositions of the invention. The child may then overwrite a portion or all of the previously made markings eliminating the color of the undercolor coloring composition as applied and leaving only the color of the overcolor coloring composition used to overwrite the undercolor color composition. Because of the surprisingly strong and immediate impact of the overcolor coloring composition used to overwrite the undercolor coloring composition, the overcolor marker appears to paint a color over the undercolor on the portions of the substrate on which it is applied.

A child may also apply the overcolor coloring composition directly to the substrate. If an undercolor coloring composition is then used to overwrite the mark laid down by the overcolor coloring composition, the overcolor coloring composition will eliminate the color contributed by the undercolor coloring composition leaving only the color of the overcolor coloring composition where the mark was previously made. The undercolor color will be see on other locations on the substrate. This change has been observed to occur more slowly than when the overcolor coloring composition is applied over the undercolor coloring composition. This slowed reaction is presumably caused by the penetration of the overcolor coloring composition into the paper substrate. The child gains great play benefit by viewing this slowly disappearing color.

Preferably, when the coloring compositions of the invention are used in the form of inks, the inks are placed in conventional markers using such nibs as bonded fiber or sintered plastic. Various undercolor coloring compositions are placed in an undercolor set of markers, each containing an appropriate different color dye. Various overcolor coloring compositions of the invention are placed in a second group of markers, each of these compositions containing an appropriate different color colorant, either a dye or pigment.

EXAMPLES

Examples of marking systems of the present invention when formulated as an ink are as follows. Quantities are in percent by weight of the total composition.

| Undercolor Color Ink Examples | | |
|---|---|---|
| Component | Example 1 Magenta Ink % | Example 2 Yellow Ink % |
| Deionized Water | 74.00 | 74.00 |
| Glycerin | 20.00 | 20.00 |
| Preservative | | |
| Nuosept 95 ™ | 0.50 | 0.50 |
| Premix | 2.50 | 2.50 |
| Dye | | |
| Acid Red 92 | 3.00 | — |
| Acid Yellow 1 | — | 3.00 |
| Component | Example 3 Orange Ink % | Example 4 Coral Ink % |
| Deionized Water | 74.50 | 74.50 |
| Glycerin | 20.00 | 20.00 |
| Preservatives | | |
| Nuosept 95 ™ | 0.50 | 0.50 |
| Premix | 2.50 | 2.50 |
| Dye | | |
| Acid Red 92 | 0.50 | 2.00 |
| Acid Yellow 1 | 2.00 | — |
| Pyranine 120 ™ | — | 1.00 |
| NaOH (5N soln) | — | 0.50 |

"Premix" in the previous and following examples is a mixture of 96.04% M-PYROL™, 1.98% PVP K-30™, and 1.98% TROYSAN POLYPHASE P-100™. The inks of examples 1–4 had acceptable working properties. For examples 1–4, the pH ranged from 7.5 to 9.0 and the density ranged from 8.8 to 9.1 pounds per gallon. For examples 1–4, the viscosity ranged from 2.5 to 3.8 centipoise.

| Overcolor Coloring Ink Examples | | | |
|---|---|---|---|
| Component | Example 5 Blue Ink % | Example 6 Yellow Ink % | Example 7 Green Ink % |
| Deionized Water | 45.00 | 43.50 | 44.50 |
| Glycerin | 20.00 | 20.00 | 20.00 |
| Phosphoric Acid | 30.00 | 30.00 | 30.00 |
| Citric Acid | 1.00 | 1.00 | 1.00 |
| Preservative | | | |
| Nuosept 95 ™ | 0.50 | 0.50 | 0.50 |
| Premix | 2.50 | 2.50 | 2.50 |
| Acid Blue 93 | 1.00 | — | — |
| Acid Yellow 23 | — | 2.50 | — |
| Acid Green 3 | — | — | 1.50 |
| Component | Example 8 Pink Ink % | Example 9 Green Ink % | Example 10 Lt Blue Ink % |
| Deionized Water | 45.50 | 43.50 | 45.75 |
| Glycerin | 20.00 | 20.00 | 20.00 |
| Phosphoric Acid | 30.00 | 30.00 | 30.00 |
| Citric Acid | 1.00 | 1.00 | 1.00 |
| Preservative | | | |
| Nuosept 95 ™ | 0.50 | 0.50 | 0.50 |
| Premix | 2.50 | 2.50 | 2.50 |
| Acid Violet 19 | 0.50 | — | — |
| Acid Yellow 23 | — | 2.00 | — |
| Acid Blue 93 | — | 0.50 | 0.25 |

The inks of examples 5–10 had acceptable working properties. For examples 5–10, the pH ranged from 2.0 to 3.5 and the density ranged from 9.0 to 9.2 pounds per gallon. For examples 5–10, the viscosity ranged from 3.5 to 4.5 centipoise. Here also, premix is a mixture of 96.04% M-PYROL™, 1.98% PVP K-30™, and 1.98% TROYSAN POLYPHASE P-100™.

Two examples of overcolor coloring compositions in the form of an ink using a pigment dispersion as a colorant are as follows. Quantities are in percent by weight of the total composition.

| Overcolor Ink Examples | | |
| --- | --- | --- |
| Component | Example 11 Red Ink % | Example 12 Green Ink % |
| Water | 50.0 | 45.0 |
| Glycerin | 5.0 | 5.0 |
| Phosphoric Acid | 30.0 | 30.0 |
| Pigment Dispersion | | |
| Fluorescent Scarlet SF-1013 | 15.0 | — |
| Fluorescent Green SF-1012 (30%–40% pigment) | — | 20.0 |

In using the various above described overcolor coloring compositions and undercolor coloring compositions, a child could place a mark of the erasable blue coloring composition on paper, perhaps to paint the sky. If the child wishes to add in a yellow sun, a green tree growing up into the blue sky, and red flowers growing into the blue sky into the picture, the child may easily use the above-indicated color changing ink compositions, without tainting any of the colors. Alternatively, if the child draws a sun using the yellow color changing composition, he or she may draw in the sky using the blue erasable ink right over the yellow without spoiling the colors.

The multiple coloring composition system of the invention may also be formulated as a paint. When compositions of the invention are formulated as a paint, such as a child's paint, they must necessarily be formulated with a higher viscosity to enable to the application of the of the paint with a brush. This viscosity is achieved in two ways. First, a binder may generally be added to the composition. This binder may be in the form of a modified starch such as STADEX 140™ marketed by A.E. Staley Manufacturing Company. Binders are typically used in amounts of from about 0% to about 25% by weight of the composition.

Additionally, paints may contain a thickener to provide body to the paint. One suitable thickener is STAR-POL™ 560, a modified starch thickener, marketed by A.E. Staley Manufacturing Company. Another suitable thickener, especially for use in elevated pH compositions such as the color changing composition of the invention is LAPONITE RDS™, a synthetic hectorite. The amount of thickener used depends upon the amounts of binder and other components used in the composition, although typically about 1% to about 5% by weight thickener is used.

Paints may also contain a filler or extender. Fillers and extenders are generally solid particles added to paint compositions which provide body to the paint but which do not provide color. Common extenders are talcs, such as magnesium silicate hydrate, and clays and two suitable extenders for compositions of the invention are TALCRON MP™ 45-26 marketed by Pfizer Inc. and IMSIL A-108™. Extenders may be used in amounts of from about 0% to about 40% by weight of the composition. Where extenders or pigments are used in a paint, a dispersant may also be used to maintain the solid particles dispersed in the paint. Dispersants, such as NOPCOSPERSE 44™, are typically used in amounts of from about 0.1% to about 5%. Also, many paints optionally include a freeze/thaw protector. Freeze/thaw additives improve the stability of the paint over widely varying temperatures. One suitable freeze/thaw protector is propylene glycol which is effective when used in compositions of the invention in amounts from about 1% to about 10% by weight, with the most preferred range being from about 1.5% to about 6.5% by weight.

In a further embodiment of the present invention, a variety of erasable colors may be painted or otherwise applied on a substrate, such as paper, and the substrate, with these colors applied could be supplied to a child in combination with the coloring changing composition in the form of a paint or an ink in a marker. An appropriate color changing composition could then be applied onto the substrate in areas where the child desired a change of color to produced the desired color change.

While particular embodiments of the invention have been shown, it will of course be understood that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention. All references, patents, and previous applications cited are herein incorporated by reference in their entireties.

What is claimed is:

1. A multiple coloring composition system comprising:
    (a) an undercolor aqueous coloring composition comprising an undercolor dye whose coloring ability is destroyed in the presence of a pH of about 4 or less; and
    (b) an overcolor aqueous coloring composition comprising a colorant capable of maintaining its characteristic color in the presence of a pH of about 4 or less and an effective amount of an acid sufficient to yield a pH of said overcolor coloring composition of about 4 or less.

2. The multiple coloring composition system of claim 1, said acid being present in an amount sufficient to yield a pH of said overcolor aqueous coloring composition of from about 2 to about 4.

3. The multiple coloring composition system of claim 2, wherein said acid is selected from the group consisting of phosphoric acid, sulfuric acid, citric acid, and mixtures thereof.

4. The multiple coloring composition system of claim 3, said acid added in an amount of from about 5% to about 30% by weight of said overcolor aqueous coloring composition.

5. The multiple coloring composition system of claim 1, wherein said undercolor dye of said undercolor coloring composition is selected from the group consisting of xanthene dyes, pthalocyanine dyes, and azo dyes which are unstable in the presence of a pH of about 4 or less.

6. The multiple coloring composition system of claim 5, wherein said undercolor dye of said undercolor coloring composition is selected from the group consisting of Acid Red 92, Acid Yellow 1, Solvent Red 48, Solvent Green 7, and mixtures thereof.

7. The multiple coloring composition system of claim 1, wherein said colorant of said overcolor coloring composition is selected from the group consisting of pigments, polymethine dyes, triphenylmethane dyes, and azo dyes which are stable in the presence of a pH of about 4 or less.

8. The multiple coloring composition system of claim 7, wherein said colorant of said overcolor coloring composition is selected from the group consisting of Acid Blue 93, Acid Yellow 23, Acid Green 3, Acid Violet 19, pigments, and mixtures thereof.

9. The multiple coloring composition system of claim 1, wherein said overcolor aqueous coloring composition further comprises an anti-oxidant.

10. The multiple coloring composition system of claim 9, wherein said anti-oxidant is present in an amount of from about 0.1% to about 3% by weight.

11. The multiple coloring composition system of claim 10, wherein said anti-oxidant is selected from the group consisting of citric acid, ascorbic acid, sodium hypophosphite, and mixtures thereof.

12. The multiple coloring composition system of claim 1, wherein said undercolor aqueous coloring composition further comprises a stabilizing base.

13. The multiple coloring composition system of claim 12, wherein said stabilizing base is present in an amount of from about 0.2% to about 2%.

14. The multiple coloring composition system of claim 13, wherein said stabilizing base is selected from the group consisting of sodium hydroxide, sodium carbonate, monosodium EDTA, and mixtures thereof.

15. The multiple coloring composition system of claim 1, wherein said undercolor and said overcolor aqueous coloring compositions further comprise a humectant.

16. The multiple coloring composition system of claim 15, wherein said humectant is present in an amount of from about 0% to about 30% by weight.

17. The multiple coloring composition system of claim 16, wherein said humectant is selected from the group consisting of glycerin, propylene glycol, diethylene glycol, and mixtures thereof.

18. The multiple coloring composition system of claim 1, wherein said undercolor and said overcolor aqueous coloring compositions further comprise a preservative.

19. The multiple coloring composition system of claim 18, wherein said preservative is present in said undercolor coloring composition in an amount of from about 0.2% to about 5% by weight.

20. The multiple coloring composition of claim 19, wherein said preservative is selected from the group consisting of an aqueous bicyclic oxazolidines solution, a 3-iodo- 2-propynyl butyl carbamate, and mixtures thereof.

21. The multiple coloring composition of claim 19, wherein a base is present in the said undercolor coloring composition in an effective amount to yield a pH of said undercolor of from about 7.0 to about 9.0.

22. The multiple coloring composition system of claim 21, wherein said base is present in an amount of from about 0.2% to about 2% by weight.

23. The multiple coloring composition system of claim 22, wherein said base is selected from the group consisting of sodium hydroxide, sodium carbonate, monosodium EDTA, and mixtures thereof.

24. An ink composition comprising:
(a) an undercolor aqueous ink comprising an undercolor dye whose coloring ability is destroyed in the presence of a pH of about 4 or less in an amount of from about 0.5% to about 6% by weight of the undercolor ink; and
(b) an overcolor aqueous ink comprising from about 0.5% to about 40% by weight of said overcolor ink of an acid; and from about 0.5% to about 6% by weight of said overcolor ink of a colorant which maintains characteristic color in the presence of a pH of about 4 or less.

25. A coloring changing marking system comprising at least one undercolor marking instrument and an overcolor marking instrument, said undercolor marking instrument containing an undercolor ink composition comprising a dye whose coloring ability is destroyed in the presence of a pH of about 4 or less, and said overcolor writing instrument containing an overcolor aqueous ink composition comprising (1) from about 0.5% to about 40% by weight of an acid; and (2) from about 0.5% to about 6% by weight of a colorant which maintains its characteristic color in the presence of a pH of about 4 or less.

26. The color changing marking system of claim 25, wherein said marking instrument comprises a fluid reservoir and a nib in fluid connection with said fluid reservoir.

27. A paint composition comprising:
(a) an undercolor aqueous paint comprising an undercolor dye whose coloring ability is destroyed in the presence of a pH of about 4 or less; and
(b) an overcolor aqueous paint comprising from about 0.5% to about 40% by weight of an acid; from about 0.5% to about 6% by weight of an overcolor dye that maintains its characteristic color in the presence of a pH of about 4 or less; and a thickener in an amount of from about 1% to about 5% by weight.

28. A coloring composition comprising
(a) from about 0.5% to about 30% by weight of an acid; and (c) from about 0.5% to about 6% by weight of a colorant which maintains its characteristic color in the presence of a pH of about 4 or less.

* * * * *